Dec. 15, 1959    D. JACKSON    2,916,968
METHOD OF CONSTRUCTING ANNULAR VARIABLE DENSITY LIGHT FILTERS
Filed March 25, 1957

Inventor
Donald Jackson
By
Attorneys

United States Patent Office 2,916,968
Patented Dec. 15, 1959

2,916,968

METHOD OF CONSTRUCTING ANNULAR VARIABLE DENSITY LIGHT FILTERS

Donald Jackson, Cambridge, England, assignor to Pye Limited, Cambridge, England, a company of Great Britain Application March 25, 1957, Serial No. 648,276

Claims priority, application Great Britain March 29, 1956

2 Claims. (Cl. 88—108)

The present invention relates to a variable density light filter made from translucent synthetic resin material, such as acrylic sheet. According to this invention the variable density is obtained by reducing the thickness of the material, and/or preshaping the material, according to the required law.

According to a feature of the invention, the light filter is of annular form, the density being variable around the disc or annulus of synthetic resin material of which the filter is formed by reducing the thickness thereof according to the desired law.

The invention also consists in a light filter which is made by laminating sheet plastic of different light densities to form a composite sheet, and then reducing the thickness of the sheet obliquely to the plane of lamination.

In order that the invention may be more fully understood, reference will now be made to the accompanying drawing, in which.

Figure 1:
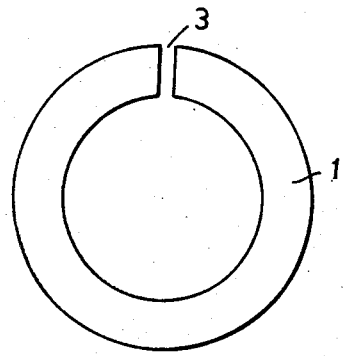
Figure 1 is a plan view of a light filter according to the invention.
Figure 2:
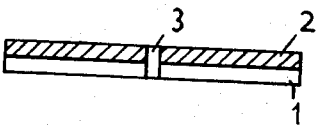
Figures 2, 3 and 4 are diametric sectional views through the filter, showing different steps in the method of construction.
Figure 3:
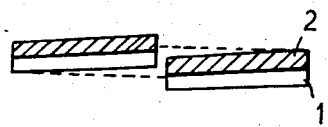
Figure 4:
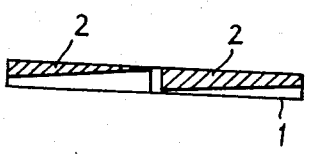

Referring to the drawing, two sheets 1 and 2 of plastic material of different light transmission characteristics, for example one transparent and the other neutral grey, are laminated together and the composite sheet is cut into rings (Fig. 1). The ring is slotted at one place, 3 (Figs. 1 and 2), and the ring twisted to a helical form (Fig. 3) and held in this position, for example by cementing the edges of the ring joint together in their displaced positions. The ring is then machined, for example, by turning and/or grinding into a flat disc (Fig. 4) in such a manner, that the required variable density law, for example, a linear, logarithmic, sine, or other law, is produced around the ring. The ring is finally polished flat.

It will be understood that various modifications may be made without departing from the scope of the invention. For example, instead of being constructed from annular sheets of a neutral tone the filter may be made from coloured sheets. Such filters may be incorporated in a colour-comparator or mixer, in which case the filter may or may not be calibrated.

I claim:

1. A method of constructing a variable density light filter consisting of laminating together at least two annular discs of synthetic resin material of different light densities and of substantially uniform thickness to form a composite annular disc, slotting the composite disc at one point therearound, twisting said disc into a helical form, maintaining said disc in said helical form and machining the opposite outer surfaces of the disc obliquely to the planes of the discs and parallel to each other.

2. A method as claimed in claim 1, wherein the sheet is maintained in said helical form by cementing together the displaced cut edges of the sheet.

References Cited in the file of this patent

UNITED STATES PATENTS

| | | |
|---|---|---|
| 970,111 | Gschwind | Sept. 13, 1910 |
| 1,325,204 | Raleigh | Dec. 16, 1919 |
| 2,224,726 | Finnegan | Dec. 10, 1940 |
| 2,331,027 | Harrison | Oct. 5, 1943 |